United States Patent [19]

Kumar et al.

[11] Patent Number: 5,130,937
[45] Date of Patent: Jul. 14, 1992

[54] METHOD AND APPARATUS FOR STORING VELOCITY DATA

[75] Inventors: Lalit Kumar, Bellevue; Rex B. Peters, Woodinville, both of Wash.

[73] Assignee: Sundstrand Corporation, Rockford, Ill.

[21] Appl. No.: 490,157

[22] Filed: Mar. 7, 1990

[51] Int. Cl.$^5$ .................................................. G01P 7/00
[52] U.S. Cl. ........................................ 364/565; 73/503; 73/511; 73/517 AV
[58] Field of Search ............ 73/517 AV, 510, DIG. 1, 73/503, 511, 862.59; 364/565, 566

[56] References Cited

U.S. PATENT DOCUMENTS

| | | | |
|---|---|---|---|
| 4,365,512 | 12/1982 | Woodruff | 73/503 |
| 4,467,651 | 8/1984 | Peters et al. | 73/51 AV X |
| 4,601,206 | 7/1986 | Watson | 73/510 X |
| 4,712,426 | 12/1987 | Peters | 73/517 AV X |
| 4,712,427 | 12/1987 | Peters | 73/517 AV |
| 4,896,268 | 1/1990 | MacGugan | 364/566 X |

*Primary Examiner*—Tod Swann
*Attorney, Agent, or Firm*—Christensen, O'Connor, Johnson & Kindness

[57] ABSTRACT

A method and apparatus for determining a change in velocity of a body following a power disruptive event. An accelerometer (10, 50) includes quartz crystals (16 and 18, 60 and 62), which produce output signals indicative of the acceleration to which a body connected to the accelerometer is subjected. The acceleration measured is directed along the sensitive axis of the accelerometer. The quartz crystals are selected to have different scale factors, $K_1$ and $K_2$, which define the change in frequency of the quartz crystal from its no-load resonant frequency as a force is applied to it. The quartz crystals are connected between a supporting case (14) and a proof mass (12) so that a given acceleration applied to the proof mass along its sensitive axis causes one of the crystals to experience a tension force and the other to experience a compression force. A processor (86) determines the change in velocity of the body as a function of the change in phase of the signals produced by the quartz crystals at a time, $t_1$, and a subsequent time, $t_2$, and further in response to the scale factors, $K_1$ and $K_2$. Since the quartz crystals continue to oscillate during a brief interruption of their driving signal, the change in velocity of the body during a time interval from $t_1$ to $t_2$ can be determined after recovery from a brief power disruptive event that has occurred during that interval.

20 Claims, 3 Drawing Sheets

METHOD AND APPARATUS FOR STORING VELOCITY DATA

GOVERNMENT RIGHTS

The invention described and claimed herein below was made with government support and the government may have certain rights in the invention.

TECHNICAL FIELD

This invention generally pertains to a method and apparatus for determining a change in velocity of a body during a time interval, and more specifically, for storing velocity data during a disruptive event that occurs during the time interval and interrupts an output signal from an accelerometer used to monitor acceleration of the body.

BACKGROUND OF THE INVENTION

An inertial guidance system typically uses gyroscopes and accelerometers to continuously monitor acceleration to which a body is subjected, with respect to three orthogonal axes. Using well-known laws of physics, the body's position and heading can be determined at any point in time from the acceleration data, based upon knowledge of the initial position of the body and the time over which the acceleration occurs. However, even a brief interruption in the continuity of velocity data can greatly affect the accuracy of the system in determining the position and heading of the body.

Certain types of accelerometers used in inertial guidance systems are characteristically resistant to loss of velocity data during brief interruptions in the processing of their output signals. For example, a specific force integrating resolver (SFIR) type accelerometer relies on the principle of gyroscopic precession to measure changes in velocity of an attached body. A spinning body tends to preserve its angular momentum, and therefore rate of precession is unaffected during a brief power interruption. Although SFIR accelerometers are very accurate, due to their mechanically complex design, they are relatively expensive. Also, because of their extensive use of moving parts that tend to wear out with continued use, the operational life span of these devices is shorter than accelerometers using piezoelectric crystal acceleration sensors, such as a vibrating beam accelerometer.

Vibrating beam accelerometers typically include two quartz crystals that are each mounted between a supporting frame and a proof mass. The proof mass is suspended from the supporting frame by a flexure hinge that allows the proof mass to deflect freely along the direction of acceleration, yet firmly supports it in two other orthogonal directions. The quartz crystals are driven into resonance, producing a signal indicative of the acceleration acting on a body to which the accelerometer is attached. Acceleration acts on the proof mass, causing the frequency of vibration of the crystals to change in proportion to the acceleration. Generally, one of the quartz crystals is mounted so that it experiences a compression force, while the other experiences a tension force in response to a given acceleration acting on the proof mass along a sensitive axis of the accelerometer.

Continued development of vibrating beam accelerometers has improved their accuracy to a point that they are now being considered as replacements for SFIR accelerometers in critical guidance systems. However, unlike SFIR accelerometers, vibrating beam accelerometers do not include a spinning mass that inherently retains its angular momentum during a short-term interruption of their output signal.

A method for using a vibrating beam accelerometer to provide a velocity storage capability is disclosed in commonly assigned U.S. Pat. No. 4,712,427. The method for storing and recovering data describing a body's change in velocity disclosed in that patent uses the sum and differences in phase of signals produced by the two quartz crystals over an unknown interval of time spanning a brief loss in electrical power supplied to the navigation system including the system clock and the accelerometer. This method is limited to a velocity storage/recovery of about 0.005 to 0.01 g-secs. U.S. Pat. No. 4,712,427 also describes a method to increase the range of recoverable velocity change. However, the technique requires the use of four force-sensing crystals, which is equivalent to employing two accelerometers to measure acceleration along one axis. Clearly, it is preferable to use a single accelerometer (two force-sensitive crystals) for this purpose. In addition, certain applications require computation of velocity change at least two orders of magnitude greater than the range possible with the technique of U.S. Pat. No. 4,712,427. It is thus an object of the present invention to provide these advantages.

SUMMARY OF THE INVENTION

In accordance with one aspect of the claimed invention, a method is defined for recovering velocity data for a body from an attached accelerometer following a power disruptive event. The accelerometer is energized with electrical power subject to interruption by the power disruptive event. Any such event also interrupts an output signal from two acceleration sensors that comprise the accelerometer. One of the acceleration sensors is subjected to a compression force and the other to a tension force in response to an acceleration acting on the body along a sensitive axis of the accelerometer.

Each acceleration sensor has a scale factor associated with the output signal from it. The scale factors define how a component of the output signal varies as a function of the acceleration. As a first step in the method, different scale factors, $K_1$ and $K_2$, are provided for the two acceleration sensors.

A first phase difference, $\Delta\Phi_1$, between the components of the output signals produced by the acceleration sensors is determined at a first time, $t_1$, prior to the power disruptive event. Following the power disruptive event, at a second time, $t_2$, a second phase difference, $\Delta\Phi_2$, between the components of output signals is determined. A change in velocity in the body between times $t_1$ and $t_2$ is then determined as a function of the scale factors and the first and second phase differences of the components of the output signals, from the relationship:

$$\Delta V = (\Delta\Phi_2 - \Delta\Phi_1)/(K_1 - K_2).$$

During the power disruptive event, an electronic memory stores the first phase difference, $\Delta\Phi_1$, and the time, $t_1$. Since the power disruptive event may occur unexpectedly, the method may further comprise the steps of storing successive phase differences determined at predetermined time intervals in the electronic memory, so that after the power disruptive event, a phase difference determined prior thereto is available for use in determining the change in velocity in the body. The clock defines the times at which each successive phase difference is determined.

To provide different scale factors, acceleration sensors may be specifically selected for use in the accelerometer, based upon their measured scale factor. Preferably, the scale factors should differ by from about 0.1 to about 0.5 percent.

An accelerometer capable of determining the change of velocity, $\Delta V$, of a body to which it is attached, from a time $t_{n-1}$ to a time $t_n$, comprises a further aspect of this invention. The accelerometer includes two opposed acceleration sensitive elements, each operative to produce a periodic output signal having a component that varies in frequency as a function of an acceleration directed along a sensitive axis of the accelerometer, as defined by a scale factor associated with each acceleration sensitive element. For a given acceleration, one of the acceleration sensitive elements is subjected to a force of compression and the other to a force of tension. Since the acceleration sensitive elements are provided with different scale factors $K_1$ and $K_2$, their periodic output signals have a varying phase relationship over time. Processor means are operative to determine a phase difference, $\Delta\Phi_{n-1}$, of the components of the output signals at the time $t_{n-1}$ and a phase difference, $\Delta\Phi_n$, at the time $t_n$. The processor means thereafter determine the change in velocity, $\Delta V$, of the body as a function of both the difference in phase and the scale factors, $K_1$ and $K_2$.

DESCRIPTION OF THE PREFERRED EMBODIMENTS

Figure 1:
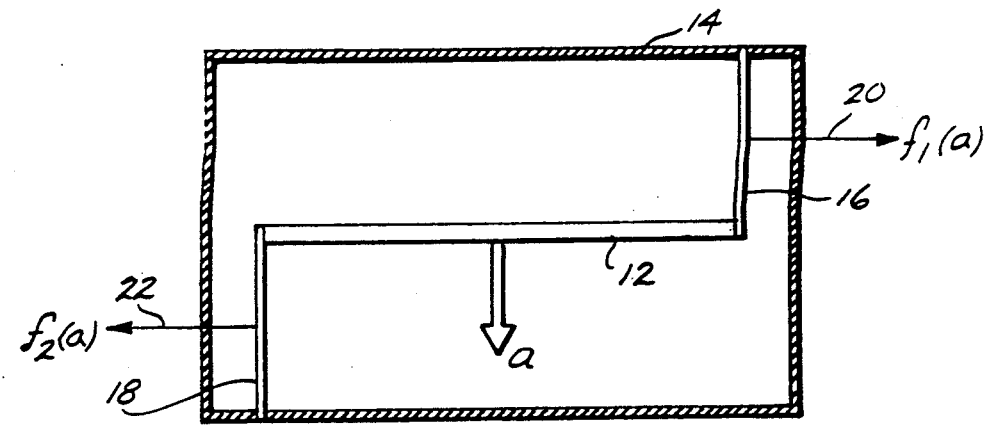
FIG. 1 is a schematic diagram showing a vibrating beam accelerometer suitable for storing velocity data during a power interruption as provided in the present invention.

With reference to FIG. 1, a vibrating beam accelerometer, generally denoted by reference numeral 10, schematically illustrates how a proof mass 12 is connected at opposite ends to a supporting case 14 through quartz crystals 16 and 18. Supporting case 14 is affixed to a body (not shown) whose acceleration is to be measured with respect to a sensitive axis of accelerometer 10. The acceleration, which in FIG. 1 is depicted using an arrow, acts on proof mass 12, subjecting quartz crystal 16 to a tension force and quartz crystal 18 to a compression force. Each of quartz crystals 16 and 18 comprise a pair of closely spaced beams that are driven to vibrate 180° out of phase with one another at a characteristic no-load resonant frequency. Alternatively, quartz crystals, each having a single beam, could be used. The output signals of quartz crystals 16 and 18 are conveyed over leads 20 and 22, respectively. Just as a violin string vibrates at a different frequency as its tension is varied, the vibrations of quart crystals 16 and 18 change frequency with respect to the applied force resulting from acceleration acting on proof mass 12. Acceleration thus causes the vibrational frequency, $f_1$, of quartz crystal 16 to increase above its no-load resonant frequency, $f_{01}$, and the vibrational frequency, $f_2$, of quartz crystal 18 to decrease from its no-load resonant frequency, $f_{02}$, as defined by the following Equations (1a) and (1b):

$$f_1 = f_{01} + K_1 a \qquad (1a)$$

$$f_2 = f_{02} - K_2 a \qquad (1b)$$

In Equations (1a) and (1b), $K_1$ and $K_2$ are scale factors associated with quartz crystals 16 and 18 that define the change in frequency of the quartz crystals as a function of acceleration, with units of Hz/g (where the acceleration is expressed as a multiple of the earth's gravitational attraction, g, and $f_1$ and $f_2$ are the frequencies of the output signals of the quartz crystals loaded by acceleration a (expressed in g's).

U.S. Pat. No. 4,712,427, which was discussed in the Background of the Invention, teaches that the velocity change, $\Delta V$, of a body to which a vibrating beam accelerometer is attached, with respect to a sensitive axis of the accelerometer can be determined during a time interval T from the relationship:

$$\Delta V = A[\Delta\phi + FT + B\Sigma\phi] \qquad (2)$$

where A, F, and B are constants, $\Delta\phi$ is the difference between the phase changes of the output signals of two acceleration sensors in the vibrating beam accelerometer over a time interval T, and $\Sigma\phi$ is the sum of the phase changes of the output signals over the time interval T. During normal uninterrupted operation, Equation (2) is equally applicable to the accelerometer schematically illustrated in FIG. 1. However, Equation (2) is limited in scope for purposes of computing velocity change during loss of power. The present invention represents a discovery of a different method for determining change in velocity during a power disruptive event.

The present invention is not limited to a vibrating beam accelerometer, but has general application to other types of accelerometers that include acceleration sensors capable of producing a periodic output signal. Since the quartz crystals used in a vibrating beam accelerometer continue to vibrate for some time after a drive signal applied to the crystals is interrupted, they can be used to determine the change in velocity of a body with respect to the sensitive axis of the accelerometer during a time interval in which a brief power interruption has occurred. The significance of this feature is explained in further detail below.

It is generally considered desirable to select quartz crystals for use in vibrating beam accelerometers that have substantially equal no-load resonant frequencies, $f_{01}$ and $f_{02}$. While it is neither practical to select exactly matched crystals nor to trim the crystals to precisely the same resonant frequency, the prior art teaches that the quartz crystals be as closely matched as possible. Contrary to such conventional practice, the present method depends upon selecting quartz crystals 16 and 18 that have different scale factors $K_1$ and $K_2$. If the acceleration sensors in an accelerometer such as that shown in FIG. 1 are provided with different scale factors, the change in velocity, $\Delta V$, caused by an acceleration aligned with the sensitive axis of the accelerometer is defined by:

$$\Delta V = [\Delta \Phi(t_2) - \Delta \Phi(t_1)]/(K_1 - K_2) \quad (3)$$

In Equation (3), the difference in phase between components of the output signals that are produced by the two acceleration sensors is determined at two separate points in time, $t_1$ and $t_2$, where $\Delta \Phi_1$ is the difference in phase between the $K_1 * a$ and the $K_2 * a$ components of the output signals caused by the acceleration at time $t_1$. Similarly, $\Delta \phi_2$ is the difference in phase between the $K_1 * a$ and the $K_2 * a$ components of the output signals caused by the acceleration at time $t_2$. Proof of the relationship defined by Equation (3) is developed as follows:

For the output signal from quartz crystal defined in Equation (1a), $$\Delta V = \int_{t_1}^{t_2} a\,dt = 1/K_1 \left[ \int_{t_1}^{t_2} f_1(a)dt - \int_{t_1}^{t_2} f_{01}dt \right] \quad (4)$$

Carrying out the integration results in:

$$\Delta V = 1/K_1[\phi_1(t_2) - \phi_1(t_1) - f_{01}t_2 + f_{01}t_1] \quad (5)$$

where phase $\phi_1(t)$ in cycles is defined by $f_1(t) = d\phi_1(t)/dt$ and $f_1(t) =$ frequency of quartz crystal 16 in cycles/sec. Now, if a new phase parameter $\Phi_1(t)$ is defined as follows:

$$\Phi_1(t_1) = \phi_1(t_1) - f_{01}t_1$$

$$\Phi_1(t_2) = \phi_1(t_2) - f_{01}t_2$$

Equation (5) becomes:

$$\Delta V = 1/K_1[\Phi_1(t_2) - \Phi_1(t_1)] \quad (6)$$

Subscripts 1 and 2 on the phase parameters refer to quartz crystals 16 and 18, respectively, whereas on time parameter t, they represent two points in time.

Similarly, with respect to the output signal from quartz crystal 18, which is under compression when proof mass 12 is subjected to acceleration a (as indicated by lead 20 in FIG. 1, the change in velocity is:

$$\Delta V = 1/K_2[\Phi_2(t_2) - \Phi_2(t_1)] \quad (7)$$

where $$\Phi_2(t_1) = f_{02} * t_1 - \phi_2(t_1)$$

$$\Phi_2(t_2) = f_{02} * t_2 - \phi_2(t_2)$$

Since the right side of both Equations (6) and (7) are equal to the same quantity, the terms on the right side of each equation can be set equal to each other, resulting in the following relationship:

$$[\Phi_1(t_2) - \Phi_1(t_1)]/[\Phi_2(t_2) - \Phi_2(t_1)] = K_1/K_2 \quad (8)$$

which is equivalent to:

$$[(\Phi_1(t_2) - \Phi_2(t_2)) - (\Phi_1(t_1) - \Phi_2(t_1))]/[\Phi_2(t_2) - \Phi_2(t_1)] = (K_1 - K_2)/K_2 \quad (9)$$

Substituting Equation (7) into Equation (9) results in:

$$\Delta V = [(\phi_1(t_2) - \Phi_2(t_2)) - (\Phi_1(t_1) - \Phi_2(t_1))]/(K_1 - K_2) \quad (10)$$

Equation (10) simplifies to Equation (3), where $\Delta \Phi(t_2) = \Phi_1(t_2) =$ phase difference between quartz crystals 16 and 18 at time $t_2$, and similarly, $\Delta \Phi(t_1) = \Phi_1(t_1) - \Phi_2(t_1) =$ phase difference between quartz crystals 16 and 18 at time $t_1$.

Accordingly, the velocity change experienced by accelerometer 10 during a time interval $\Delta t$, between times $t_1$ and $t_2$, can be determined from the phase differences between quartz crystals 16 and 18 at times $t_1$ and $t_2$, given scale factors $K_1$ and $K_2$.

If identical quartz crystals 16 and 18 were used in accelerometer 10, for a given applied acceleration, a, the two quartz crystals would experience equal and opposite changes in the frequency of their output signals and the components of those output signals comprising the change in frequency would stay in phase. However, if the scale factors of the two crystals are biased or selected so that $K_1$ does not equal $K_2$, there is a phase shift between the components of the output signals, which changes with time. This phase shift enables the value of $\Delta V$ to be determined according to Equation (3).

Furthermore, since quartz crystals 16 and 18 continue to vibrate for some time after drive power is cut off, changes in the phase relationship of the $aK_1$ and $aK_2$ components of the output signal from quartz crystals 16 and 18 are preserved, so long as the crystals continue free oscillation and the phase shift, as defined by the numerator of Equation (3), is not greater than half a cycle. Due to this characteristic of a vibrating beam accelerometer, a change in velocity of the body to which it is attached can be determined during a power disruptive event, while other conventional accelerometers would lose track of changes in velocity during the time that the power supply for the accelerometer (and its data processing circuit) is interrupted.

Figure 6:
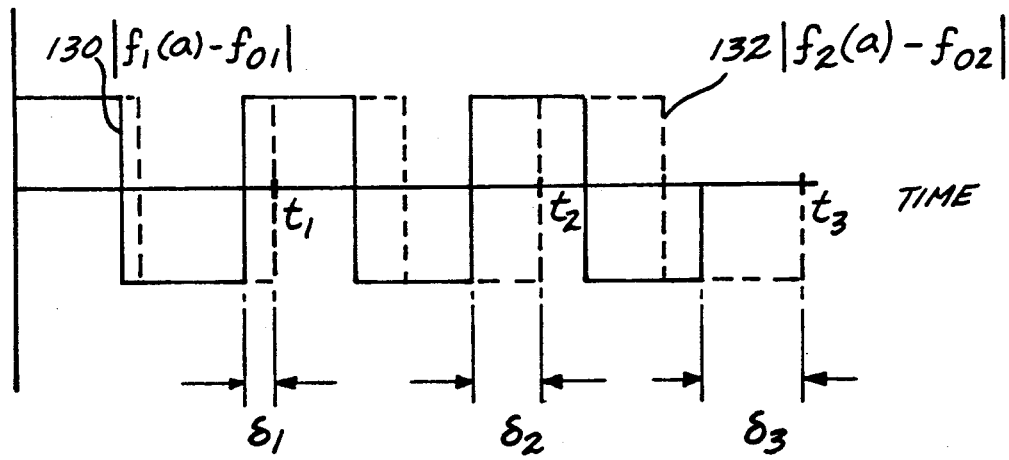
FIG. 6 is a graph showing the phase relationship (exaggerated) between the two output signals from acceleration sensors in the accelerometer of the first and second embodiments, as a function of time.

Referring now to FIG. 6, a line 130 illustrates the time varying value for the absolute magnitude of the change in frequency for quartz crystal 16 resulting from acceleration, a, acting on proof mass 12, i.e., $|f_1(a) - f_{01}|$. Similarly, a dashed line 132 illustrates the time varying value for the absolute magnitude of the change in frequency of quartz crystal 18 caused by acceleration a, i.e., $|f_2(a) - f_{02}|$. If the values for the scale factors of quartz crystals 16 and 18 were identical, lines 130 and 132 would be concurrent or overlapping at all points in time. However, because $K_1$ does not equal $K_2$, an initial phase difference $\delta_1$ (equivalent to $\Delta \Phi(t_1)$ on the time scale) is developed at a time $t_1$ and a phase difference $\delta_2$ (equivalent to $\Delta \Phi(t_2)$ on the time scale) is developed at a time $t_2$, where times $t_1, t_2, \ldots t_n$ occur at integral cycles of the signal represented by dashed line 132.

The usable limit for determination of a change in velocity of the body to which accelerometer 10 is attached is therefore limited to the time required for the phase difference between the signals represented by lines 130 and 132 to go through 180° of phase angle, i.e., one-half cycle of phase shift. If a power disruptive event causes the electrical power supply for accelerometer 10 to be interrupted for more than one-half cycle of the phase shift, determination of ΔV will be in error due to the inherent ambiguity in the determination of that value from Equation (3).

Selection of appropriate scale factors, $K_1$ and $K_2$, permit specification of the maximum ΔV that can be recovered by a vibrating beam accelerometer, in terms of g-seconds. For example, if a quartz crystal has a resonant frequency of 35 kHz, a full-scale acceleration equal to 30 g's, and a full-scale change in frequency of about 10% of the resonant frequency, a scale factor of about 100 cycles/g-second might be selected for quartz crystal 18. The other quartz crystal 16 used in the accelerometer would likely be selected to have a scale factor equal to 100.1 cycles/g-second. Accordingly, the maximum possible ΔV recovery for the accelerometer corresponds to 500 cycles or about 5 g-seconds. For an acceleration equal to 15 g's, the change in velocity ΔV, during one millisecond is 0.015 g-seconds. Thus, the change in velocity of a body can be recovered for a time interval of about 333 milliseconds, if it experiences an acceleration of about 15 g's. If the acceleration is less than 15 g's, recovery of velocity data during correspondingly longer time intervals is possible.

In the above example, $K_1$ is 0.1% greater than $K_2$. A greater range of recoverable ΔV can be provided by selecting a value for scale factor $K_1$, which differs from $K_2$ by less than 0.1%. However, as the percentage difference between the $K_1$ and $K_2$ scale factors decreases, the resolution with which the change in velocity can be determined decreases in a corresponding fashion. Accordingly, the optimum difference between the scale factors $K_1$ and $K_2$ depends upon the resolution required in the application, the duration of time during which the output signal from the accelerometer is likely to be interrupted due to a power disruptive event, and the maximum acceleration likely to be encountered during the power disruptive event.

Figure 2:
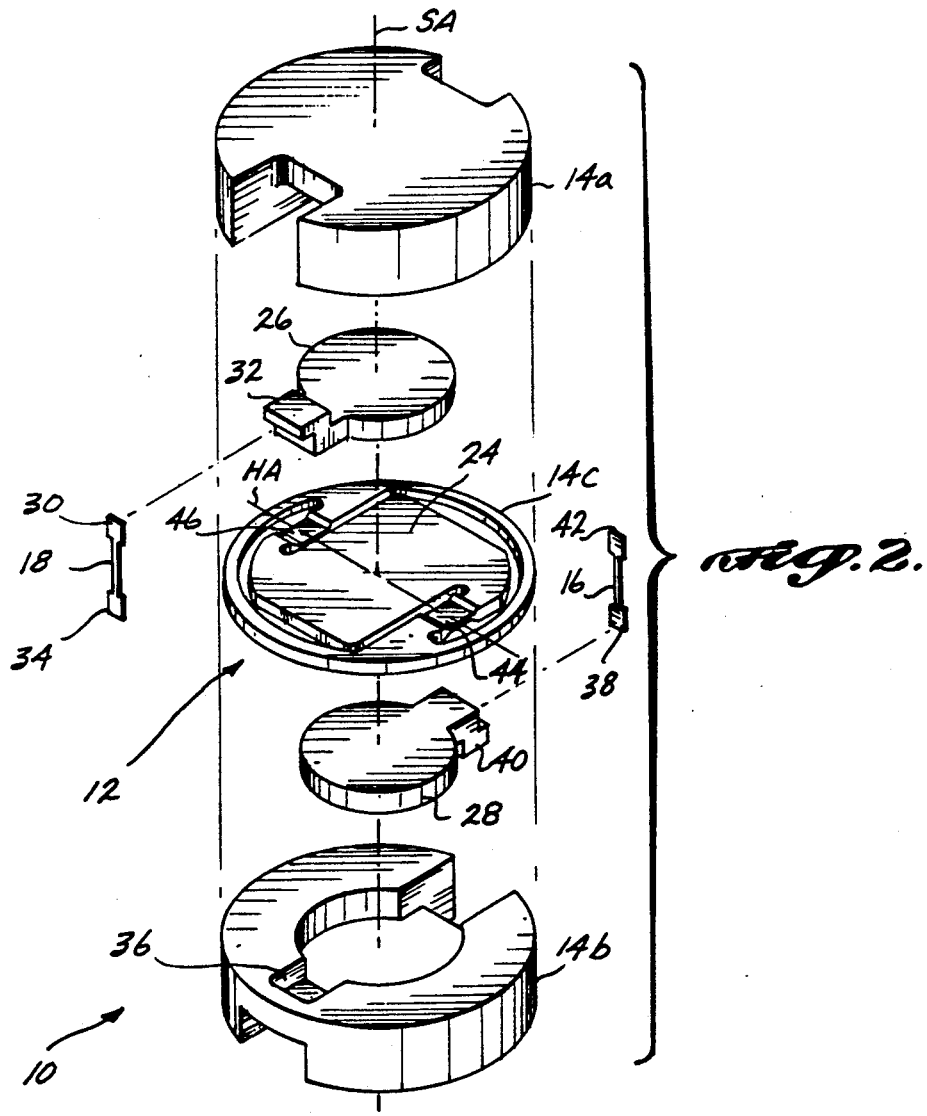
FIG. 2 is an exploded isometric view of a first embodiment for the vibrating beam accelerometer schematically shown in FIG. 1.

Referring now to FIG. 2, a simplified isometric exploded view illustrates the key components of a first preferred embodiment of vibrating beam accelerometer 10, which functions as explained above with reference to FIG. 1. As shown in FIG. 2, accelerometer 10 includes an upper supporting case 14a and a lower supporting case 14b. Proof mass 12 comprises a quartz reed assembly 14c, including an annular support 15, which is captured between upper case support 14a and lower case support 14b.

Figure 3:
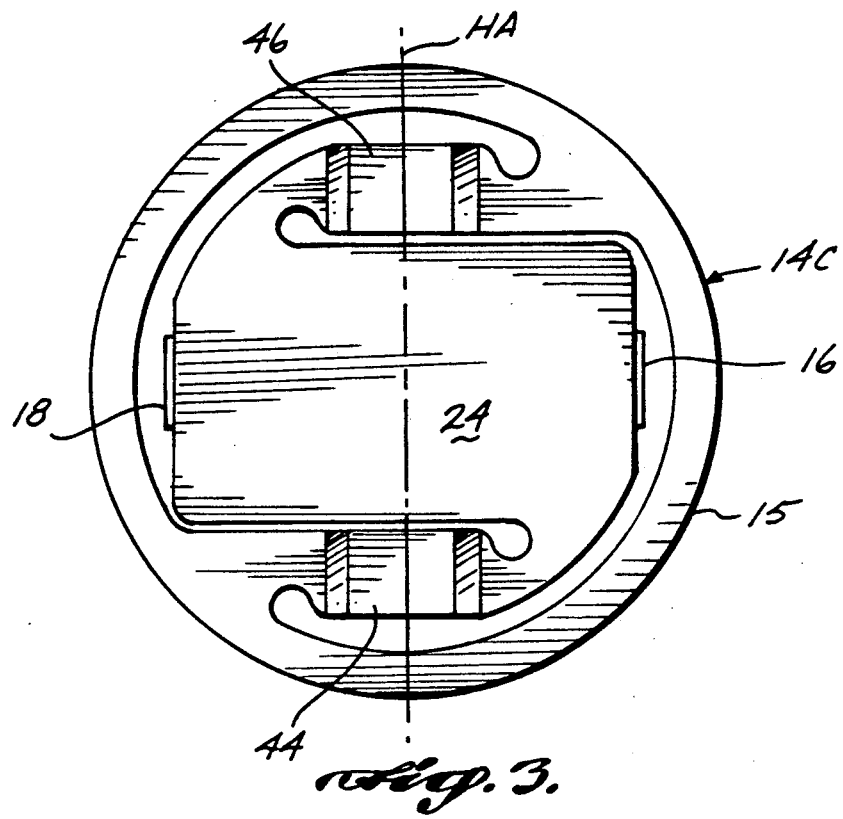
FIG. 3 is a cross-sectional view of the accelerometer shown in FIG. 2.

As shown more clearly in FIG. 3, the central portion of quartz reed assembly 14c includes a proof mass base 24, which is attached to annular support 15 by flexures 44 and 46. The flexures are disposed on opposite sides of proof mass base 24, permitting it to deflect along a sensitive axis (SA) which extends out of the plane of the proof mass base as illustrated in FIG. 2. In addition, proof mass base 24 is free to rotatably pivot about a hinge axis (HA) that extends through the center of flexures 44 and 46.

Referring again to FIG. 2, proof mass weights 26 and 28 are attached to opposite planar surfaces of proof mass base 24. An end 30 of quartz crystal 18 is affixed to a tab 32 disposed on one end of proof mass weight 26; an opposite end 34 of the quartz crystal is affixed in a slot 36 formed within lower supporting case 14b. Similarly, an end 38 of quartz crystal 16 is attached to a tab 40 on lower proof mass weight 28, and an opposite end 42 of the quartz crystal is attached within a slot (not shown) formed within upper supporting case 14a. Quartz crystals 16 and 18 are thus disposed at opposite ends of proof mass base 24, and are connected as shown in FIG. 1 so that displacement of proof mass 12 due to a given acceleration, a, causes one of the quartz crystals to be subjected to a force of compression and the other to be subjected to a force of tension.

It should also be apparent that rotation of accelerometer 10 about the hinge axis (HA) causes both quartz crystals 16 and 18 to be subjected to a common mode force, i.e., either a force of compression or tension depending upon the direction of rotation. The angular acceleration about the hinge axis and other common mode contribution to the output signals are readily compensated in determining the acceleration aligned with the sensitive axis.

Figure 4:
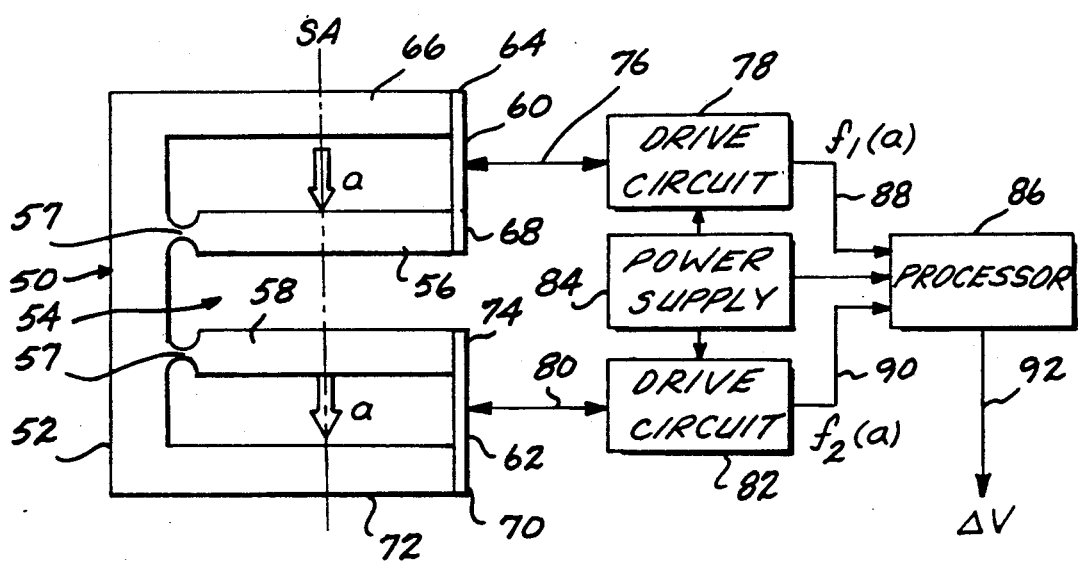
FIG. 4 is a schematic view of a second embodiment of an accelerometer, wherein a proof mass includes two pendulous arms.

In FIG. 4, a second embodiment of a vibrating beam accelerometer is schematically disclosed, generally identified by reference numeral 50. In accelerometer 50, a supporting frame 52 is connected to a proof mass 54 that comprises two pendulous weights 56 and 58. The pendulous weights extend generally parallel to each other from flexures 57 that pivotally connect each pendulous weight to supporting frame 52. The opposite ends of pendulous weights 56 and 58 are each respectively connected to quartz crystals 60 and 62. An upper end 64 of quartz crystal 60 attaches to a cantilevered portion 66 of supporting frame 52 and an opposite end 68 of quartz crystal 60 attaches to pendulous weight 56.

Similarly, an end 70 of quartz crystal 62 attaches to a cantilevered portion 72 of support frame 52, while an opposite end 74 of the quartz crystal attaches to the outwardly extending end of pendulous weight 58. Flexures 57 constrain pendulous weights 56 and 58 to pivot through a single degree of freedom, about axes that are parallel to each other and transverse to longitudinal axes (not shown) extending through pendulous weights 56 and 58.

Quartz crystals 60 and 62 are selected to have scale factors different from each other so that an acceleration, a, having a component directed along the sensitive axis (SA) of accelerometer 50 causes both pendulous weights 56 and 58 to deflect about flexures 57, subjecting one of the quartz crystals to a force of compression and the other to a force of tension.

For the acceleration, a, illustrated in FIG. 4, quartz crystal 60 is under tension, causing an increase in its frequency, while quartz crystal 62 is subjected to a force of compression, which decreases its frequency. Ideally, pendulous weights 56 and 58 should be exactly equal in mass, or else a correction must be determined to compensate for differences in the force applied to quartz crystal 60 and 62 due to acceleration. For this reason, accelerometer 50 represents a less preferred embodiment as compared to accelerometer 10, in which the quartz crystals are attached to a common proof mass.

FIG. 4 also includes a block diagram of the signal processing elements, and the drive circuits used to energize accelerometer 50 (and accelerometer 10). A drive signal is conveyed to quartz crystal 60 (or 16) over leads 76 (or 20) from a drive circuit 78, and the output signal from the quartz crystal is conveyed to a processor 86 over a lead 88. Similarly, the drive signal for quartz crystal 62 (or 18) is provided by a drive circuit 82 over leads 80 (or 22) and the output signal of the quartz crystal is supplied to processor 86 over a lead 90. A power supply 84 supplies electrical current to energize both drive circuits 78 and 82, and processor 86. Processor 86 determines the change in velocity of a body to which the accelerometer is attached between successive time intervals, according to Equation (3), and produces an output signal corresponding to the change in velocity over a lead 92 for use in an inertial guidance system or other appropriate application.

Figure 5:
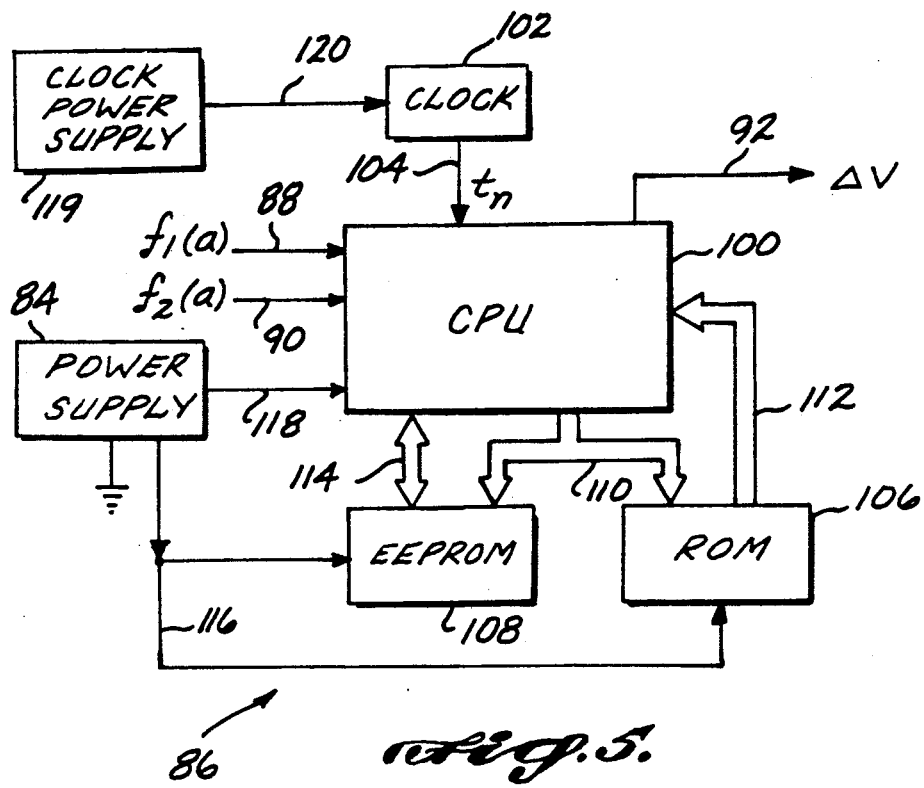
FIG. 5 is a schematic box diagram of the processor used to determine the velocity data for a body following a power interruption.

FIG. 5 shows details of processor 86; it comprises a CPU 100 that processes the frequency data produced by accelerometers 10 and 50, input to the CPU over leads 88 and 90. As explained previously, the change in phase of the absolute value of the shift in frequencies $f_1(a)$ and $f_2(a)$, and the scale factors $K_1$ and $K_2$ are used to determine the change in velocity of a body between two points in time, described generally as $t_n$ and $t_{n-1}$. CPU 100 keeps track of time based upon a time signal produced by a clock 102, which is supplied to the CPU over a lead 104.

The output signals produced by the accelerometers are processed in accordance with a program that is stored in a read only memory (ROM) 106. Specific instructions in ROM 106 are addressed via an address bus 110 and the instructions are transferred to CPU 100 over a data bus 112.

Similarly, an electronically erasable programmable read only memory (EEPROM) 108 is used to store data developed by CPU 100. The data are stored and retrieved at memory locations selected by signals transferred over address bus 110. Data is bidirectionally transmitted between CPU 100 and EEPROM 108 over a data bus 114. The data stored in EEPROM 108 includes successive values of $\Delta\Phi_n$, which are determined, as explained above, from the output signals of the quartz crystals.

Power supply 84 energizes CPU 100 with an appropriate supply voltage over leads 118, and is likewise connected to EEPROM 108 and ROM 106 via leads 116. Any brief disruption of the electrical current provided by power supply 84 prevents CPU 100 from continuously processing the output signals from the accelerometer to determine $\Delta V$ in a more conventional manner. At successive time intervals, CPU 100 determines the phase difference in respect to the changes in the output signals of the accelerometer due to acceleration and stores the successive values of $\Delta\Phi_n$ and the times $t_n$ at which those values are determined within EEPROM 108.

Following a disruption in the power supplied to CPU 100 for a brief time interval, the most recent value for the change in phase at a time $t_{n-1}$ is recalled from EEPROM 108 and is used in connection with a value for the phase difference determined after power is restored at a time $t_n$ to determine the change in velocity of the body to which the accelerometer is attached between times $t_{n-1}$ and $t_n$. EEPROM 108 is not affected by loss of power from power supply 84, since all data stored within the device are maintained until electrically erased. Similarly, clock 102 is energized from a clock power supply 119 that is separate from power supply 84, and is thus unaffected by disruption of power supply 84. Clock power supply 119 preferably includes a battery (not shown) to isolate the clock power supply from effects of any power disruptive event, such as a nuclear detonation, which briefly interrupts electrical power from power supply 84.

While the present invention has been described with respect to preferred embodiments, further modifications thereto will be apparent to those of ordinary skill in the art within the scope of the claims that follow below. For example, although a vibrating beam accelerometer represents a preferred type of accelerometer for use in storing velocity information during an event that interrupts processing of the output signals from the acceleration sensors, other types of accelerometers may also be used, so long as the accelerometer contains acceleration sensors that continue to oscillate for brief periods of time when electrical drive power is cut off.

Accordingly, the invention is not intended to be limited to the specific embodiments illustrated and described, but instead the scope of the invention should be determined entirely by reference to the claims.

The embodiments of the invention in which an exclusive property or privilege is claimed are defined as follows:

1. A method for recovering velocity data for a body from an attached accelerometer following a power disruptive event that interrupts electrical power supplied to the accelerometer, said accelerometer including two acceleration sensors, one of the acceleration sensors being characterized by a periodic output having a frequency that increases and the other by a periodic output having a frequency that decreases in response to an acceleration acting on the body along a sensitive axis of the accelerometer, each acceleration sensor having a scale factor associated with an output signal from it, said method comprising the steps of:
    (a) providing selected different scale factors $K_1$ and $K_2$ to define output signals produced by the two acceleration sensors, said output signals varying as a function of said acceleration;
    (b) determining a first phase difference, $\Delta\Phi(t_1)$, between a component of the output signals of the two acceleration sensors that changes due to the acceleration, prior to the power disruptive event, at a first time, $t_1$;
    (c) determining a second phase difference, $\Delta\Phi(t_2)$, between said components of the output signals of the two acceleration sensors, after the power disruptive event, at a second time, $t_2$; and
    (d) following the power disruptive event, determining a change in velocity of the body between times $t_1$ and $t_2$ as a function of the scale factors and the first and second phase differences of the output signals.

2. The method of claim 1, wherein the change in velocity $\Delta V$ is defined as follows:
$$\Delta V = [\Delta\Phi(t_2) - \Delta\Phi(t_1)]/(K_1 - K_2).$$

3. The method of claim 1, further comprising the steps of storing the first phase difference $\Delta\Phi(t_1)$ and the time $t_1$ in an electronic memory that is unaffected by the power disruptive event.

4. The method of claim 1, further comprising the step of storing successive phase differences determined at predetermined time intervals in an electronic memory that is unaffected by the power disruptive event, so that after said power disruptive event a phase difference determined prior to a power disruptive event is available for use in determining the change in velocity of the body.

5. The method of claim 4, wherein a clock that is unaffected by the power disruptive event determines the times at which each successive phase difference is determined.

6. The method of claim 1, wherein the step of providing different scale factors comprises the steps of measuring the scale factors of a plurality of acceleration sensors and selecting acceleration sensors that have scale factors $K_1$ and $K_2$ that differ by a predetermined amount, for use in the accelerometer.

7. The method of claim 1, wherein the scale factors $K_1$ and $K_2$ differ by from about 0.1 to about 0.5 percent.

8. A method for determining a change in velocity of a body using a vibrating beam accelerometer that includes opposed piezoelectric crystals arranged such that an acceleration acting on the body and directed along a sensitive axis of the accelerometer subjects one of the piezoelectric crystals to compression and the other to tension, the method comprising the steps of:
(a) biasing at least one of the piezoelectric crystals so that they have different scale factors, $K_1$ and $K_2$, where the scale factors define the relationship between the acceleration and a component of a periodic output signal produced by each piezoelectric crystal;
(b) at successive intervals of time $\Delta t$, determining phase differences $\Delta\Phi(t_n)$ between said components of the periodic output signals produced by the two piezoelectric crystals, where a frequency of the component varies in response to the acceleration acting on the body; and
(c) determining the change in velocity of the body, $\Delta V$, as a function of the change in the phase differences determined at two different points in time, $t_{n-1}$ and $t_n$, and as a function of the scale factors, $K_1$ and $K_2$.

9. The method of claim 8, wherein time $t_{n-1}$ occurs before an event that interrupts processing of the output signals from the accelerometer, and time $t_n$ occurs after the event, said step of determining the change in velocity being unaffected by the event.

10. The method of claim 9, wherein the interval $\Delta t$ is substantially longer in duration than the event.

11. The method of claim 8, further comprising the step of storing the phase differences $\Delta\Phi(t_n)$ in an electronic memory that is unaffected by the event, so that the phase difference at time $t_n$ is available to determine the change in velocity, $\Delta V$, after the event.

12. The method of claim 8, wherein the change in velocity is determined from the relationship:

$$\Delta V = [\Delta\Phi(t_n) - \Delta\Phi(t_{n-1})]/(K_1 - K_2)$$

where:
$\Delta\Phi(t_{n-1})$ = the phase difference at $t_{n-1}$; and
$\Delta\Phi(t_n)$ = the phase difference at $t_n$.

13. An accelerometer capable of determining the change in velocity, $\Delta V$, of a body to which the accelerometer is attached, from a time $t_{n-1}$, to a time $t_n$, comprising: two opposed acceleration sensitive elements, each operative to produce a periodic output signal having a component that varies in frequency as a function of an acceleration directed along a sensitive axis of the accelerometer, as described by a scale factor associated with each acceleration sensitive element, said acceleration causing one of the acceleration sensitive elements to be subjected to a force of compression and the other to be subjected to a force of tension, said acceleration sensitive elements being provided with different scale factors $K_1$ and $K_2$, so that said components of their periodic output signals have a time varying phase relationship; and processor means for determining a difference in phase $\Delta\Phi(t_{n-1})$ between said components of output signals from the acceleration sensitive elements at the time $t_{n-1}$, and a difference in phase $\Delta\Phi(t_n)$ of the output signals at the time $t_n$, and for determining the change in velocity $\Delta V$ of the body as a function of both the differences in phase and the scale factors.

14. The accelerometer of claim 13, wherein the accelerometer is energized by a power supply subject to a brief interruption due to a power disruptive event, and wherein the processor means are operative to determine the change in velocity $\Delta V$ of the body between times $t_{n-1}$ and $t_n$, where time $t_{n-1}$ occurs before the power disruptive event and time $t_n$ occurs after the power disruptive event.

15. The accelerometer of claim 13, wherein the processor means comprise memory means that are unaffected by the power disruptive event, for storing the difference in phase $\Delta\Phi(t_{n-1})$ at time $t_{n-1}$, and clock means that are unaffected by the power disruptive event, for determining the time $t_n$ after the power disruptive event occurs.

16. The accelerometer of claim 13, wherein the processor means determine the change in velocity of the body from the relationship:

$$\Delta V = [\Delta\Phi(t_n) - \Delta\Phi(t_{n-1})]/(K_1 - K_2)$$

where:
$\Delta\Phi(t_{n-1})$ = the difference in phase at time $t_{n-1}$; and
$\Delta\Phi(t_n)$ = the difference in phase at time $t_n$.

17. The accelerometer of claim 13, wherein the acceleration sensitive elements are selected to have scale factors $K_1$ and $K_2$ that differ in a desired ratio.

18. The accelerometer of claim 13, wherein the scale factors $K_1$ and $K_2$ of the acceleration sensitive elements differ by from about 0.1 to about 0.5 percent.

19. The accelerometer of claim 13, further comprising a proof mass that is connected to deflect due to the acceleration acting on the body, wherein the acceleration sensitive elements comprise quartz crystals that are each connected to the proof mass so that deflection of the proof mass applies a tension force to one quartz crystal and a compression force to the other quartz crystal.

20. The accelerometer of claim 19, wherein the proof mass comprises two pendulous weights of substantially equal mass, each connected by a flexure to a support, and wherein each of the quartz crystals is connected to one of the pendulous weights at a point substantially displaced from the flexure connecting that pendulous weight to the support.

* * * * *